(12) United States Patent
Worpenberg et al.

(10) Patent No.: US 6,496,996 B1
(45) Date of Patent: Dec. 24, 2002

(54) TELESCOPIC GANGWAY

(75) Inventors: Friedhelm Worpenberg, Kassel (DE); Lothar Scharf, Bad Soden-Allendorf (DE)

(73) Assignee: Thyssen Henschel Airport Systems GmbH (DE)

( * ) Notice: Subject to any disclaimer, the term of this patent is extended or adjusted under 35 U.S.C. 154(b) by 0 days.

(21) Appl. No.: 09/914,099

(22) PCT Filed: Mar. 4, 2000

(86) PCT No.: PCT/EP00/01920

§ 371 (c)(1),
(2), (4) Date: Aug. 22, 2001

(87) PCT Pub. No.: WO00/55040

PCT Pub. Date: Sep. 21, 2000

(30) Foreign Application Priority Data

Mar. 17, 1999 (DE) .......................... 199 11 881

(51) Int. Cl.$^7$ ................................ B64F 1/305
(52) U.S. Cl. ...................................... 14/71.5
(58) Field of Search ................ 14/69.5, 71.1, 14/71.3, 71.5, 71.7

(56) References Cited

U.S. PATENT DOCUMENTS

| | | | | |
|---|---|---|---|---|
| 2,688,761 A | * | 9/1954 | Good, Jr. et al. | 14/71.5 |
| 2,875,457 A | | 3/1959 | Read et al. | |
| 3,110,048 A | * | 11/1963 | Bolton | 14/71.5 |
| 3,184,772 A | * | 5/1965 | Moore et al. | 14/71.5 |
| 3,404,417 A | * | 10/1968 | Wollard et al. | 14/71.5 |
| 3,412,412 A | * | 11/1968 | Kjerulf et al. | 14/71.5 |
| 3,462,784 A | * | 8/1969 | Seipos | 14/71.5 |
| 3,524,207 A | * | 8/1970 | Giarretto | 14/71.5 |
| 3,538,529 A | * | 11/1970 | Breier | 14/71.5 |
| 3,608,119 A | * | 9/1971 | Marle | 14/71.5 |
| 3,722,017 A | * | 3/1973 | Gacs et al. | 14/71.5 |
| 3,808,626 A | * | 5/1974 | Magill | 14/71.5 |
| 4,318,197 A | * | 3/1982 | Drozd | 14/71.5 |
| 4,473,916 A | * | 10/1984 | Connold | 14/71.5 |
| 4,852,197 A | * | 8/1989 | Thomas, Jr. | 14/71.5 |
| 5,084,936 A | * | 2/1992 | Thomas, Jr. | 14/71.5 |
| 5,105,495 A | | 4/1992 | Larson et al. | |
| 5,226,204 A | * | 7/1993 | Schoenberger et al. | 14/71.5 |
| 6,330,726 B1 | * | 12/2001 | Hone et al. | 14/71.5 |

FOREIGN PATENT DOCUMENTS

| | | | |
|---|---|---|---|
| DE | 1 963 983 | 7/1970 | |
| DE | 2 057 464 | 6/1972 | |
| DE | 2 222 476 | 11/1972 | |
| DE | 83 09 614.0 | 1/1984 | |
| DE | 197 17 386 | 10/1998 | |
| DE | 199 11 881 | 9/2000 | |
| DE | 19981534 C1 | * 1/2002 | ........... B64F/1/305 |
| WO | WO98/47764 | * 10/1998 | ........... B64F/13/05 |
| WO | WO 00/09395 | 2/2000 | |

* cited by examiner

*Primary Examiner*—Robert E. Pezzuto
*Assistant Examiner*—Alexandra K. Pechhold
(74) *Attorney, Agent, or Firm*—McGlew and Tuttle, P.C.

(57) ABSTRACT

A telescopic gangway is provided for handling the passengers of single-deck or double-deck passenger airplanes parked nose in at least at one of the doors of the main deck or upper deck, which doors are located in front of, above or behind the wing. Passengers go through the lateral rear door, a door which is located directly in front of or behind the wing and through a central door of the upper deck of a doubledeck aircraft. The telecopic gangway includes tunnel elements which may be swivelled over the wing of the airplane and can be telescoped with a cabin (3) that can be moved up to the door of the airplane. A frame (6) surrounds the tunnel elements. An extension arm is rigidly or movably fastened to the frame (6), on which the telescoping tunnel elements are suspended in a height-adjustable manner. A post (4) is arranged at a sufficient safe distance from the wing and the engine of the parked airplane. The frame (6) is mounted on this post (4) pivotably by an angle of 180° around a vertical axis of rotation arranged centrally on the longitudinal axis of the tunnel elements (1, 2).

18 Claims, 6 Drawing Sheets

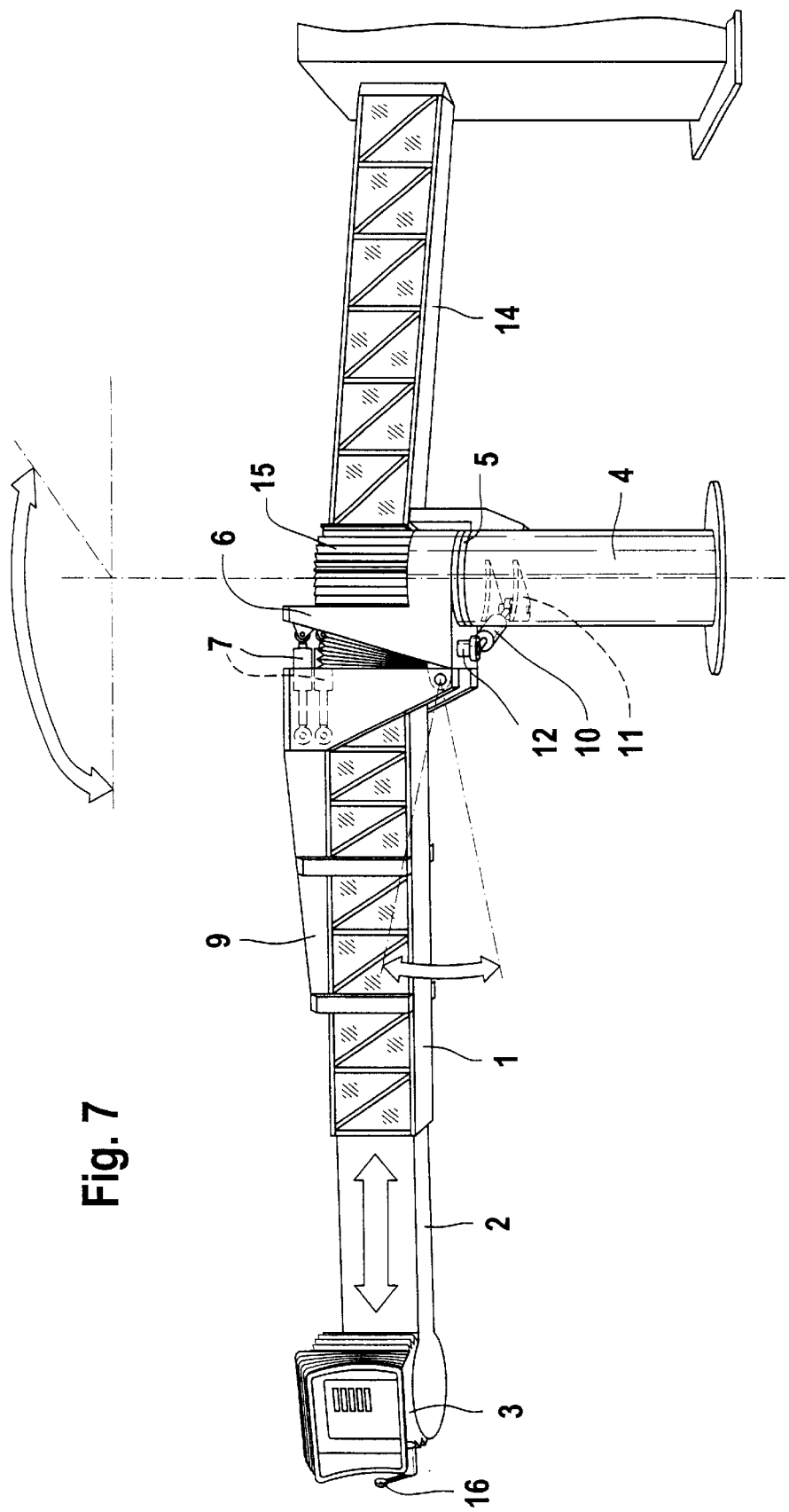

US 6,496,996 B1

TELESCOPIC GANGWAY

FIELD OF THE INVENTION

The present invention pertains to a telescopic gangway for handling the passengers of single-deck or double-deck passenger airplanes parked nose in at least at one of the doors of the main deck or upper deck, which doors are located in front of, above or behind the wing.

BACKGROUND OF THE INVENTION

A stationary telescopic gangway for loading and unloading airplanes parked at right angles to the airport terminal with a gangway part extending over the wing approximately in parallel to the fuselage and a plurality stairs which are arranged thereon offset by 90° and are displaceable in the longitudinal direction of the gangway with cabins for lateral contact with the fuselage has been known from DE OS 20 57 464. The supporting structure of the gangway is suspended on stationary pylons via a complicated framework and the stairs are mounted at the free end in a height-adjustable manner and displaceably in the longitudinal direction of the supporting structure of the gangway. This gangway structure is very complicated and can be used for limited, uniform airplanes.

A so-called "over-the-wing" telescopic gangway has been known as well, in which the telescoping tunnel parts with the cabin arranged at the end are suspended in a height-adjustable manner and pivotably through a maximum of 30° in a rigid support structure anchored on the apron (see Aviobridge MK-11 "over-the-wing" bridge, Flughafen Amsterdam Schiphol+DE OS 19 63 983).

DE 197 17 386 A1 shows a multiple telescopic gangway for embarking and disembarking passengers of jumbo jets with a gangway extension arm and a ramp gangway, which are suspended vertically displaceably on a tower or frame. In one embodiment, the gangway extension arm is suspended in two vertically displaceable support frames, wherein an inner frame is mounted on a support column rotatably around an eccentric vertical axis and an outer frame is displaceable via tangentially arranged floor rollers. However, the range of pivoting is limited to a maximum of 30° here due to the out-of-center arrangement of the vertical axis, so that the telescopic gangway has only a limited use.

SUMMARY AND OBJECTS OF THE INVENTION

The basic object of the present invention is to provide an especially variable telescopic gangway, by means of which it is possible to handle either narrow-body airplanes at the lateral tail door or wide-body and double-deck airplanes at the door arranged behind the wing or at one of the middle doors of the upper deck or wide-body airplanes also at the door arranged in front of the wing in combination with a telescopic gangway handling exclusively the nose door.

According to the invention, a telescopic gangway for handling the passengers of single-deck or double-deck passenger airplanes parked nose in at least at one of the doors of the main deck or upper deck, in which the doors are located in front of, above or behind the wing, is provided. The gangway includes tunnel elements which are pivotable over the wing of the airplane and can be telescoped with a cabin that can be moved up to the door of the airplane. A frame surrounds the non-displaceable tunnel element. An extension arm, which is rigidly or movably fastened to the frame, on which the telescoping tunnel elements are suspended in a height-adjustable manner in the case of a rigidly fastened extension arm, are suspended in a height-adjustable manner together with the extension arm in the case of a movable extension arm. A leg is arranged at a sufficient safe distance from the wing and the engine of the parked airplane. On the leg the frame is mounted pivotably by an angle of 180° around a vertical axis of rotation arranged centrally on the longitudinal axis of the tunnel elements.

Provisions are made according to the present invention for the part of the telescopic gangway which leads over or along the wing and comprises the extension arm and the telescoping tunnel with the cabin, which said tunnel is suspended on or is directly fastened to the extension arm, to be fastened to a frame, which surrounds the gangway tunnel and is pivotable around a central vertical axis of rotation on a leg firmly anchored on the apron in front of the wing. The gangway tunnel is rigidly connected to the frame in the horizontal pivoting direction. In addition, the cabin-side end of the telescopic gangway can be adjusted in height around a horizontal axis of rotation arranged in the area of the frame by means of lifting cylinders or other mechanical adjusting means fastened in an articulated manner either at the apron-side or terminal-side end of the extension arm.

Depending on the category of the airplanes to be handled, a short or long leg may be provided to keep the adjustment of the cabin height as small as possible. The frame may be mounted according to the present invention on a ball type rim bearing on the leg. The frame can be pivoted by up to 180° by means of lifting cylinders acting in both directions or other adjusting means which act on bearing brackets. The gangway tunnel with the parts fastened thereto can be raised and lowered by up to 45° in relation to the approximately horizontal apron by means of the lifting cylinders arranged at the end of the extension arm.

The weight of the part of the telescopic gangway pointing toward the airplane is preferably balanced with a counterweight fastened to the extension arm. However, the counterweight with the part of the extension arm projecting toward it may be eliminated in the case of a correspondingly flexurally rigid embodiment of the leg, the ball type rim bearing and the frame.

It has proved to be favorable for safety reasons to provide a number of distance-measuring devices or sensors or contacts, which automatically raise the parts pivoting over the wing in the case of contact and an unacceptable approach, on the underside of the parts pivoting over the wing, especially of the gangway tunnel.

The gangway structure according to the present invention may also be used especially for handling passenger ships.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is another perspective view of the telescopic gangway shown in FIG. 5 as viewed from the apron.

DESCRIPTION OF THE PREFERRED EMBODIMENTS

Figure 1:
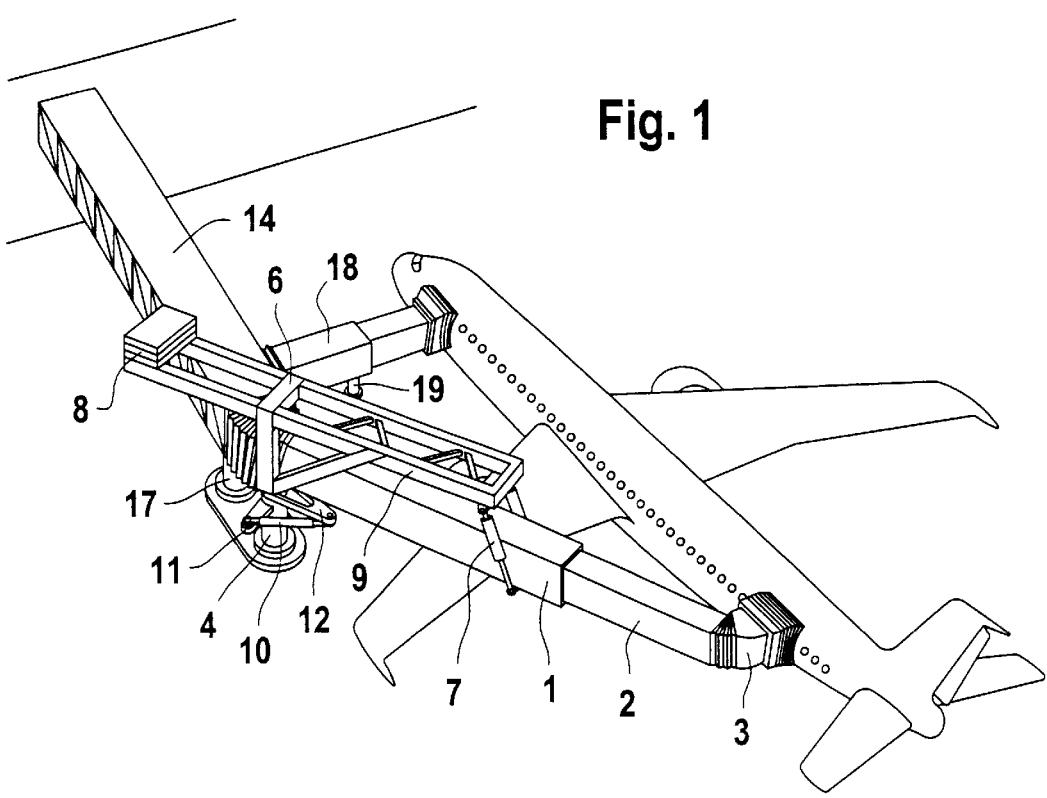
FIG. 1 is a perspective view of the telescopic gangway with short leg, which is docked with a lateral tail door of a "narrow-body" airplane, complemented by a "nose loader" docked with the nose door as well as with a fixed connection web connected to the airport terminal.
Figure 2:
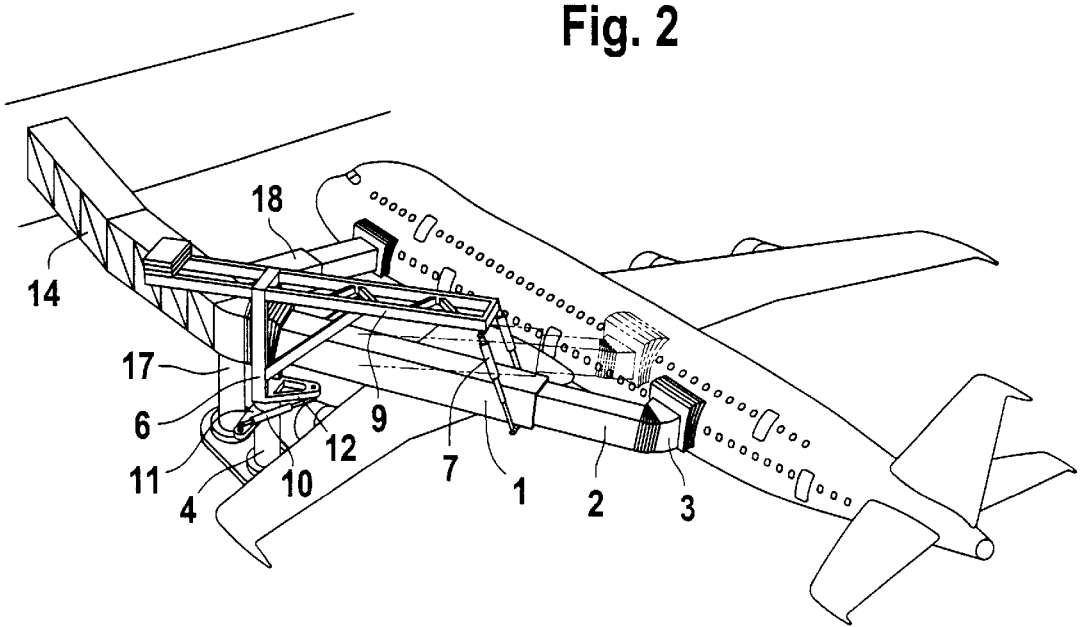
FIG. 2 is a perspective view of the telescopic gangway with long leg, which is docked with the door of the main deck, which door is located behind the wing or at one of the middle doors of the upper deck of a future double-deck airplane.
Figure 3:
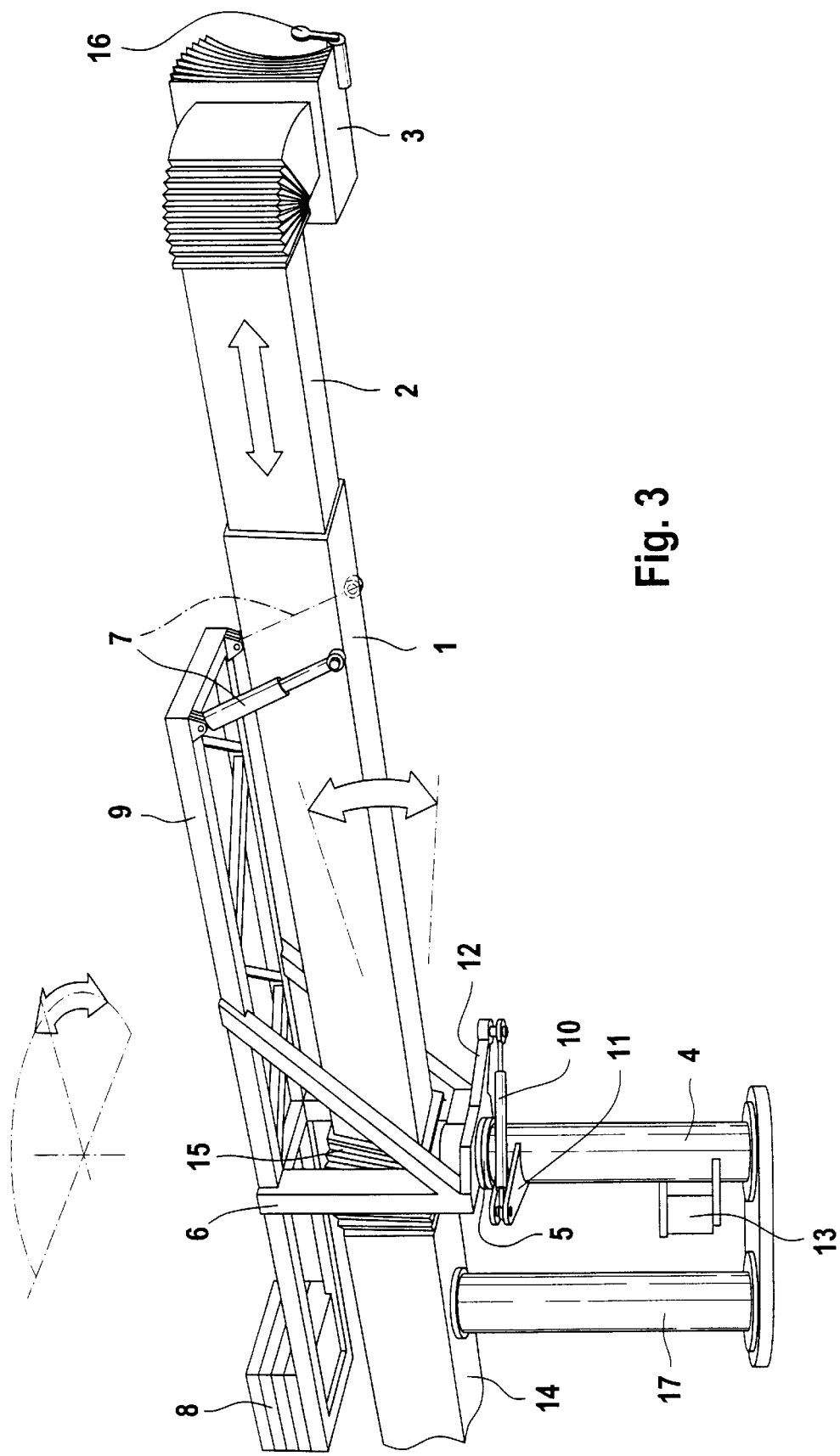
FIG. 3 is a perspective view of the telescopic gangway with a fixed connection web joined to the telescopic gangway as a view from the apron in the direction of the airplane, not shown.
Figure 5:
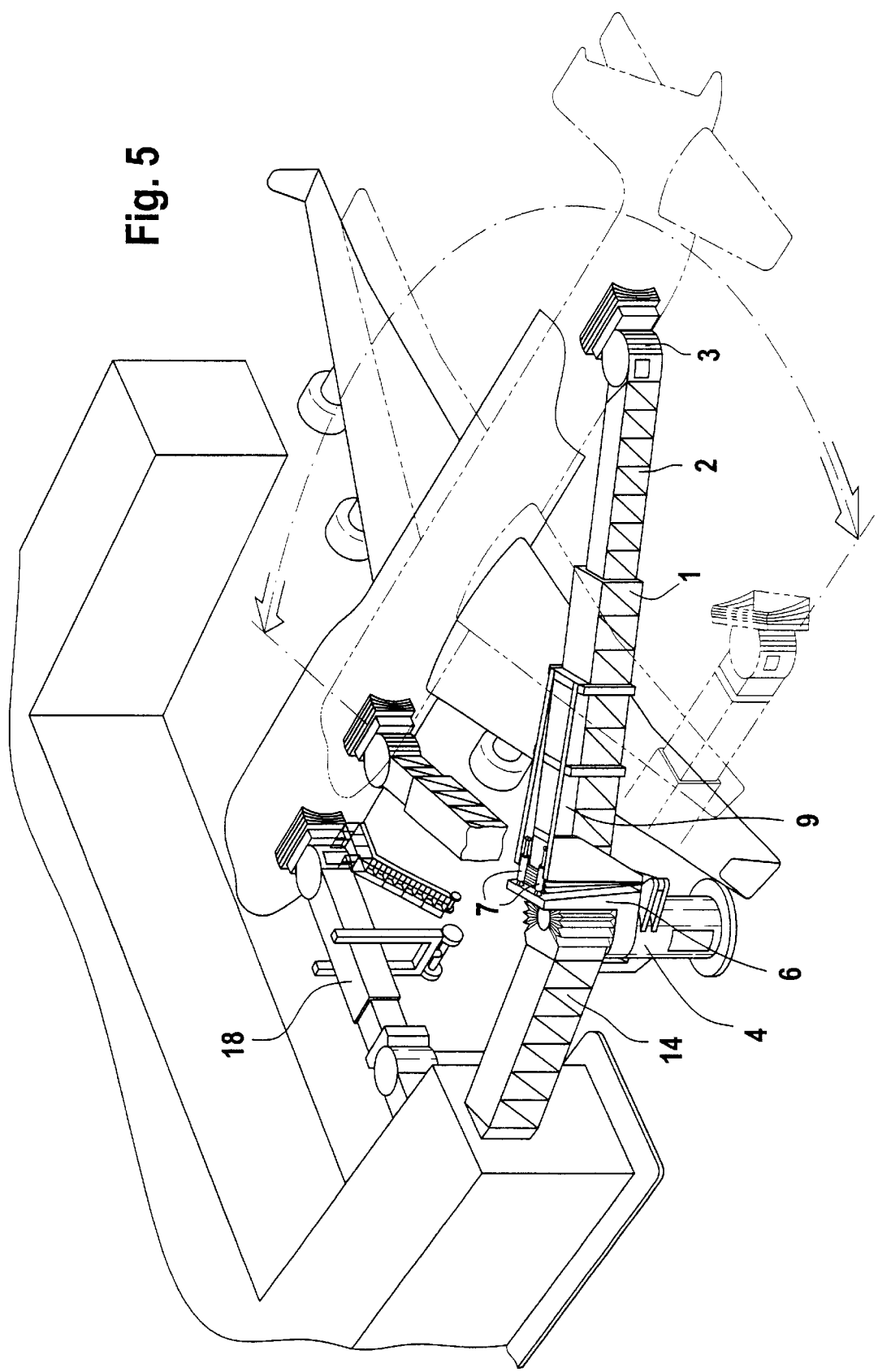
FIG. 5 is a perspective view of a telescopic gangway docked optionally with the lateral tail door of a narrow-body airplane or with the door of a wide-body airplane, which door is located in front of the wing, without counterweight and a projecting extension arm.
Figure 6:
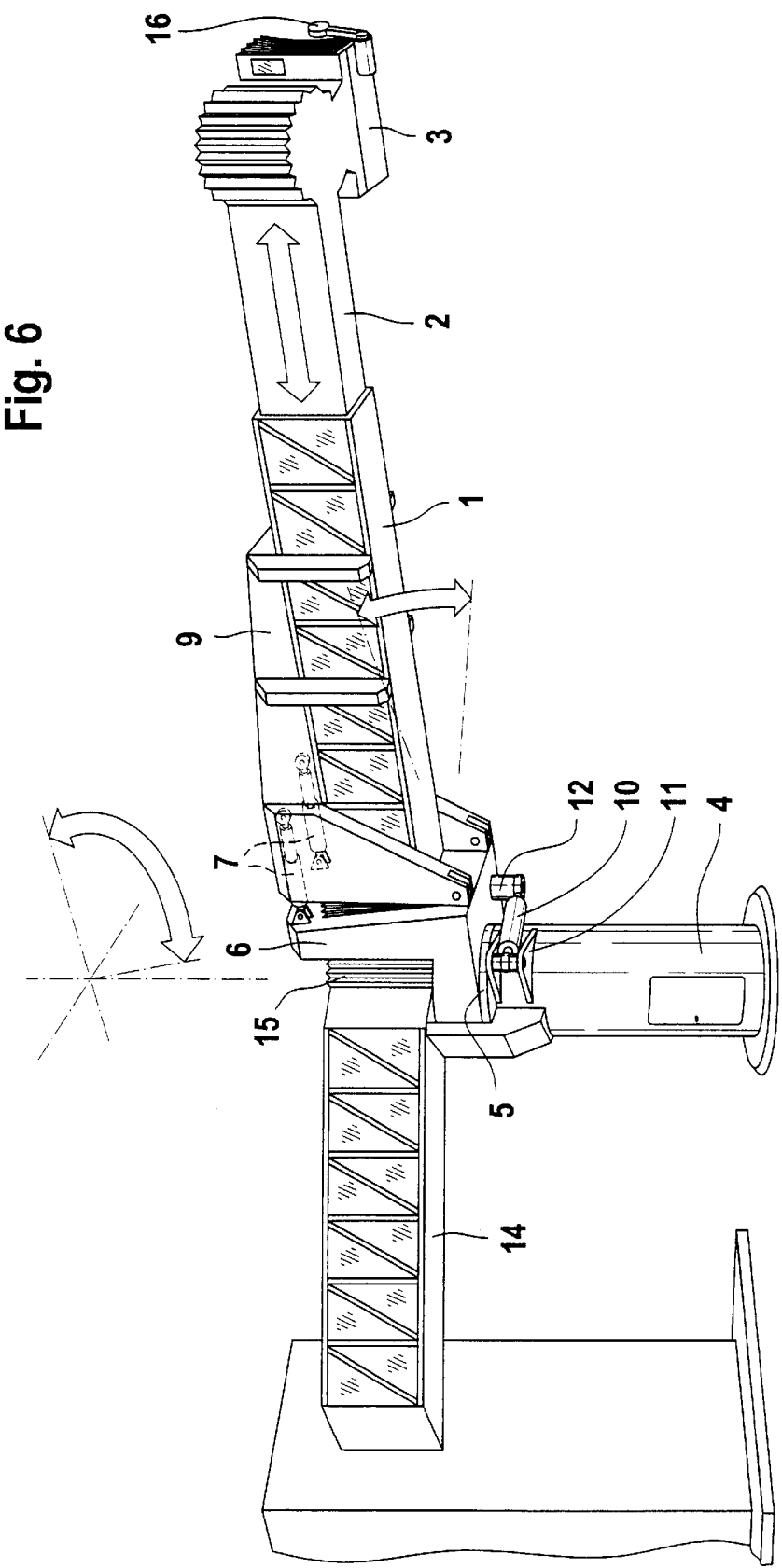
FIG. 6 is a perspective view of the telescopic gangway shown in FIG. 5 with joined fixed connection web in a view from the apron in the direction of the airplane, not shown.

Referring to the drawings in particular, the figures show clearly only the components of the telescopic gangway that are relevant for the present invention. The telescoping tunnels 1 and 2 leading over (FIGS. 1, 2 and 5) or along (FIG. 5) the wing with the cabin 3 arranged movably at the airplane-side end of the tunnel are pivotable as a whole around the leg 4 anchored on the apron by means of a ball type rim bearing 5. An essentially rectangular or square frame 6 is pivotable by up to 180° around a vertical axis on the ball type rim bearing. The gangway tunnel 1, which is pivotable around an essentially horizontal axis of rotation approximately in the middle of the frame, passes through the frame 6. The extension arm 9 is connected to the frame 6 either rigidly (FIGS. 1 through 4) or movably (FIGS. 5 through 7) by means of two lifting cylinders 7. The horizontal extension arm 9 is connected to the rear counterweight 8 at the top end of the frame 6 in the first case, and the extension arm 9, which is preferably designed as a cantilever beam, is connected at the bottom to the frame 6 in an articulated manner in the second case. In the embodiment shown as an example in FIGS. 1 through 4, the gangway tunnel 1 is suspended on the end of the extension arm 9 facing the cabin 3 in an articulated and height-adjustable manner by means of two lifting cylinders 7. In the exemplary embodiment without counterweight and a projecting extension arm, which is shown in FIGS. 5 through 7, the extension arm 9 projecting toward the cabin 3 is, in contrast, connected to the frame 6 in an articulated manner at the bottom and in a height-adjustable manner at the top by means of two lifting cylinders 7.

The entire telescopic gangway is preferably pivoted around the leg 4 by means of a lifting cylinder 10, which acts in both directions and is fastened in an articulated manner to projecting bearing brackets 11 and 12 on the leg 4 and on the frame 6. Instead of by means of the lifting cylinder 10, the telescopic gangway can also be pivoted by means an electric motor-driven pivoting drive, which engages the toothed ball type rim bearing 5 and is usually used, e.g., in tower slewing cranes. The hydraulic unit 13 for the pivoting and lifting cylinders 10 and 7 is located at the foot of the leg and in the leg 4, respectively.

The flexible connection between the gangway tunnel 1 and the fixed connection web 14 can be brought about by means of a bellows 15 or a rotunda with vertical rolling walls which is usually used in telescopic gangways. The underside of the gangway tunnel 1 leading over the wing is provided with a sufficient number of distance-measuring devices, sensors or contacts, which automatically move the gangway upward in case of contact or an unacceptable approach. After correct docking of the telescopic gangway with the door of the airplane, the contact wheel 16 performs the automatic height adjustment.

Figure 4:
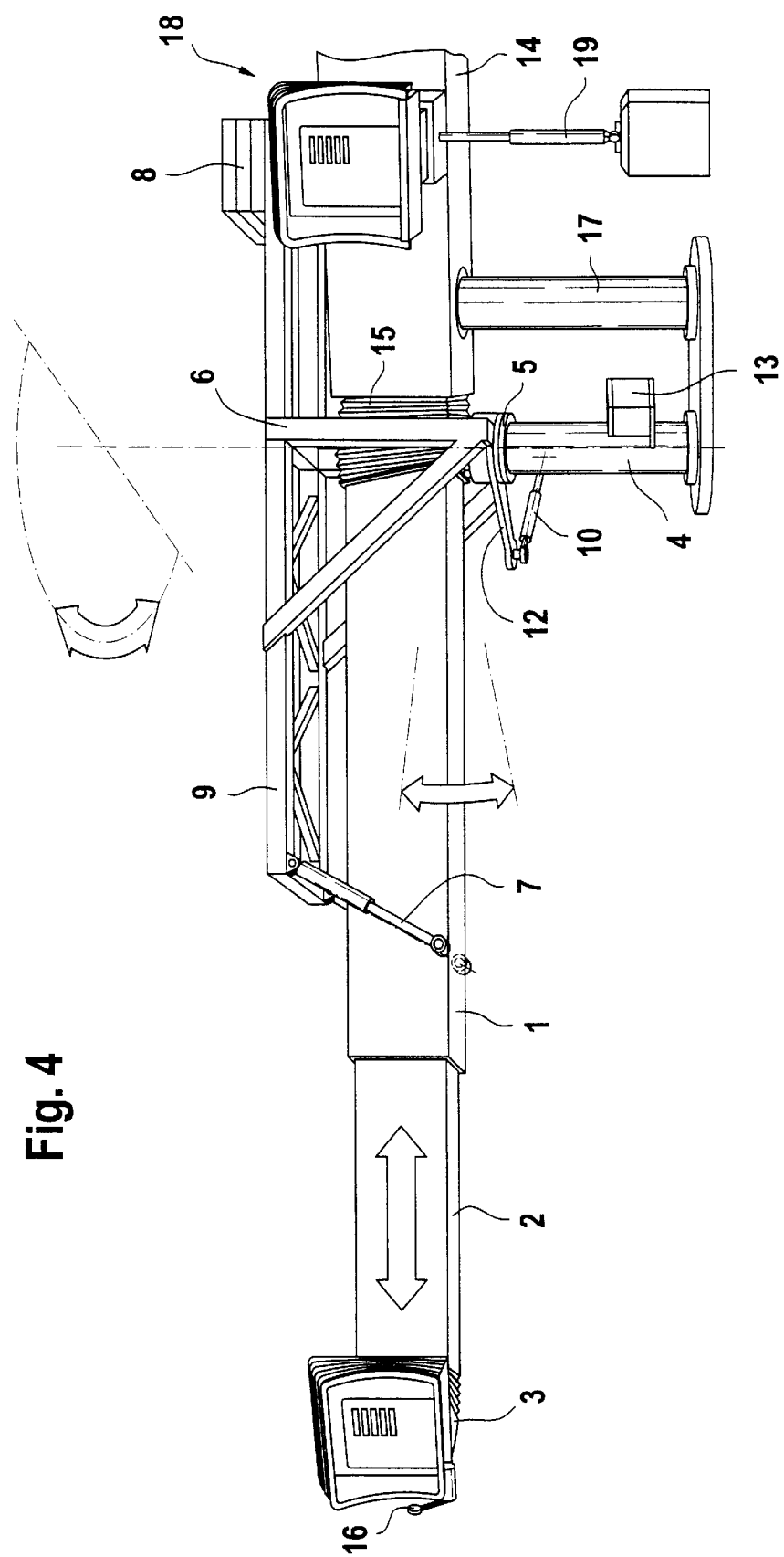
FIG. 4 is another perspective view of the telescopic gangway with a "nose loader" joined to the fixed connection web as viewed from the apron.

FIG. 4 additionally shows a fixed support 17 for the connection web 14. A prior-art "nose loader" gangway 18 with a height adjusting means 19 is additionally located at this connection web 14 for handling the nose door. The directions of movement of the telescopic gangway are additionally indicated by double arrows in FIGS. 3 and 4.

FIG. 5 shows a connection web 14 which is supported directly on a bracket support projecting from the leg 4. Furthermore, a prior-art telescopic gangway 18 is additionally shown for handling the nose door. The directions of movement of the telescopic gangways are additionally indicated by double arrows in FIGS. 3, 4, 6, and 7.

While specific embodiments of the invention have been shown and described in detail to illustrate the application of the principles of the invention, it will be understood that the invention may be embodied otherwise without departing from such principles.

What is claimed is:

1. A telescopic gangway for handling the passengers of single-deck or double-deck passenger airplanes parked nose in at least at one of the doors of the main deck or upper deck, which doors are located in front of, above or behind the wing, the telescopic gangway comprising:
    tunnel elements pivotable over the wing of the airplane and telescoping with a cabin movable up to the door of the airplane said tunnel elements including a non-displaceable tunnel element;
    a frame surrounding said non-displaceable tunnel element;
    an extension arm rigidly movably fastened to said frame, said telescoping tunnel elements being suspended in a height-adjustable manner on said extension arm with said extension arm rigidly fastened or being suspended in a height-adjustable manner together with said extension arm movably connected; and
    a leg mounted on the ground and arranged at a sufficient safe distance from the wing and the engine of the parked airplane, the gangway being spaced from the ground in an area between said leg and an airplane, said frame being mounted pivotably by an angle of 180° around a vertical axis of rotation arranged centrally on the longitudinal axis of said tunnel elements;
    respective projecting bearing brackets;
    lifting cylinders between said bearing brackets acting in both directions or other pivoting drives usually used in tower slewing cranes fastened to said leg and to said frame for pivoting the telescopic gangway around said leg.

2. A telescopic gangway in accordance with claim 1, further comprising: ball type rim bearing, wherein said frame is mounted on said leg with said ball type rim bearing.

3. A telescopic gangway in accordance with claim 1, further comprising distance-measuring devices or sensors arranged on an underside of said non-displaceable tunnel element, pivotable over the wing of the airplane and/or of an inner tunnel of said tunnel elements and/or of said cabin in order to prevent a contact with the wing or to automatically raise the gangway tunnel correspondingly in case of an unacceptable approach.

4. A telescopic gangway for handling the passengers of single-deck or double-deck passenger airplanes parked nose in at least at one of the doors of the main deck or upper deck, which doors are located in front of, above or behind the wing, the telescopic gangway comprising:

tunnel elements pivotable over the wing of the airplane and telescoping with a cabin movable up to the door of the airplane said tunnel elements including a non-displaceable tunnel element;

a frame surrounding said non-displaceable tunnel element;

an extension arm rigidly movably fastened to said frame, said telescoping tunnel element being suspended in a height-adjustable manner on said extension arm with said extension arm rigidly fastened or being suspended in a height-adjustable manner together with said extension arm movably connected;

a leg mounted on the ground and arranged at a sufficient safe distance from the wing and the engine of the parked airplane, the gangway being spaced from the ground in an area between said leg and an airplane, said frame being mounted pivotably by an angle of 180° around a vertical axis of rotation arranged centrally on the longitudinal axis of said tunnel elements;

a counterweight arranged on a side of said extension arm connected to said frame, said side facing away from said cabin.

5. A telescopic gangway in accordance with claim 4, wherein one or more lifting cylinders or mechanical spindle drives are fastened in an articulated manner either to said non-displaceable tunnel element and to the airplane-side end of said rigid extension arm or to a top end of said frame as well as to the terminal-side top end of the movable extension arm for adjusting the height of the airplane-side end of the telescopic gangway.

6. A telescopic gangway for handling the passengers of single-deck or double-deck passenger airplanes parked nose in at least at one of the doors of the main deck or upper deck, which doors are located in front of, above or behind the wing, the telescopic gangway comprising:

tunnel elements pivotable over the wing of the airplane and telescoping with a cabin movable up to the door of the airplane said tunnel elements including a non-displaceable tunnel element, a frame surrounding said non-displaceable tunnel element;

an extension arm rigidly movably fastened to said frame, said telescoping tunnel elements being suspended in a height-adjustable manner on said extension arm with said extension arm rigidly fastened or being suspended in a height-adjustable manner together with said extension arm movably connected;

a leg mounted on the ground and arranged at a sufficient safe distance from the wing and the engine of the parked airplane, the gangway being spaced from the ground in an area between said leg and an airplane, said frame being mounted pivotably by an angle of 180° around a vertical axis of rotation arranged centrally on the longitudinal axis of said tunnel elements;

said extension arm being pivotable by up to 180° around a vertical axis of rotation and said non-displaceable tunnel element can be raised and lowered by up to 45° in relation to an approximately horizontal apron around a horizontal axis of rotation arranged in an area of said frame.

7. A telescopic gangway, comprising:

an inner tunnel element;

a gangway tunnel element telescopingly connected to said inner tunnel element, said inner tunnel element and said gangway tunnel element being pivotable;

a frame surrounding said gangway tunnel;

an extension arm rigidly movably fastened to said frame, said inner tunnel and said gangway tunnel elements being suspended in a height-adjustable manner on said extension arm or being suspended in a height-adjustable manner together with said extension arm; and a leg supported by the ground, said leg fully supporting said inner tunnel element and said gangway tunnel element, said leg including a vertical axis of rotation, said frame being mounter pivotably by an angle of 180° around said vertical axis of rotation, said vertical axis being arranged centrally on a longitudinal axis of said tunnel elements.

8. A telescopic gangway in accordance with claim 7, further comprising:

respective projecting bearing brackets;

lifting cylinders between said bearing brackets acting in both directions or other pivoting drives usually used in tower stewing cranes fastened to said leg and to said frame for pivoting the telescopic gangway around said leg.

9. A telescopic gangway in accordance with claim 7, wherein one or more lifting cylinders or mechanical spindle drives are fastened in an articulated manner either to said gangway tunnel element and to the airplane-side end of said rigid extension arm or to a top end of said frame as well as to the terminal-side top end of the movable extension arm for adjusting the height of the airplane-side end of the telescopic gangway.

10. A telescopic gangway in accordance with claim 7, further comprising a counterweight arranged on a side of said extension arm connected to said frame, said side facing away from said cabin.

11. A telescopic gangway in accordance with claim 7, wherein said extension arm can be pivoted by up to 180° around a vertical axis of rotation and said gangway tunnel can be raised and lowered by up to 45° in relation to an approximately horizontal apron around a horizontal axis of rotation arranged in an area of said frame.

12. A telescopic gangway in accordance with claim 7, further comprising distance-measuring devices or sensors arranged on an underside of said gangway tunnel pivotable over the wing of the airplane and/or of an inner tunnel of said tunnel elements and/or of said cabin in order to prevent a contact with the wing or to automatically raise the gangway tunnel correspondingly in case of an unacceptable approach.

13. A telescopic gangway comprising;

a leg mounted on the ground and having a leg axis substantially normal to the ground;

frame pivotally connected to said leg about said leg axis;

an first tunnel element connected to said frame and pivotal with said frame about said leg axis;

a second tunnel element telescopically connected to said first tunnel element and pivotal with said frame and said first tunnel element about said leg axis, said frame fully supporting said first and second tunnel elements on said leg;

an extension arm extending from said frame and connected to said first tunnel element;

said extension arm being rigidly connected to said frame;

said first and second tunnel elements being pivotally suspended from said extension arm.

14. A telescopic gangway in accordance with claim 13, wherein:

said first and second tunnel elements are connected to said frame in a height adjustable manner.

15. A telescopic gangway in accordance with claim 13, wherein:

said first and second tunnel elements are pivotally connected to said frame about an axis substantially parallel to the ground.

16. A telescopic gangway comprising:

a leg mounted on the ground and having a leg axis substantially normal to the ground;

frame pivotally connected to said leg about said leg axis;

an first tunnel element connected to said frame and pivotal with said frame about said leg axis;

a second tunnel element telescopically connected to said first tunnel element and pivotal with said frame and said first tunnel element about said leg axis, said frame fully supporting said first and second tunnel elements on said leg;

an extension arm extending from said frame and connected to said first tunnel element;

said extension arm is rigidly connected to said first tunnel element, said extension arm is pivotally connected to said frame.

17. A telescopic gangway in accordance with claim 16, wherein:

said extension arm is pivotally connected to said frame about a lifting axis substantially parallel to the ground;

a lifting device connects said extension arm to said frame, said lifting device and said lifting axis are arranged to have said lifting device experience tensile force from a weight of said first and second tunnel elements.

18. A telescopic gangway in accordance with claim 17, wherein:

said first tunnel element has a ground side facing the ground, said ground side is arranged between said lifting device and the ground.

\* \* \* \* \*